(12) United States Patent
Ibraimi et al.

(10) Patent No.: US 9,806,890 B2
(45) Date of Patent: Oct. 31, 2017

(54) ATTRIBUTE-BASED DIGITAL SIGNATURE SYSTEM

(75) Inventors: Luan Ibraimi, Eindhoven (NL);
Muhammad Asim, Eindhoven (NL);
Milan Petkovic, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 861 days.

(21) Appl. No.: 13/698,888

(22) PCT Filed: Apr. 27, 2011

(86) PCT No.: PCT/IB2011/051828
§ 371 (c)(1),
(2), (4) Date: Nov. 19, 2012

(87) PCT Pub. No.: WO2011/145011
PCT Pub. Date: Nov. 24, 2011

(65) Prior Publication Data
US 2013/0073860 A1    Mar. 21, 2013

(30) Foreign Application Priority Data
May 19, 2010    (EP) .................................. 10163291

(51) Int. Cl.
*H04L 9/32*    (2006.01)
*H04L 9/08*    (2006.01)

(52) U.S. Cl.
CPC ............ *H04L 9/3255* (2013.01); *H04L 9/085* (2013.01); *H04L 9/0891* (2013.01)

(58) Field of Classification Search
CPC ..... H04L 9/3268; H04L 9/3255; H04L 9/085; H04L 9/3263; G06F 21/33
See application file for complete search history.

(56) References Cited

U.S. PATENT DOCUMENTS

| 8,189,791 B2 | 5/2012 | Garcia | |
| 2004/0111607 A1* | 6/2004 | Yellepeddy | H04L 9/3255 713/155 |

(Continued)

FOREIGN PATENT DOCUMENTS

| CN | 101515319 A | 8/2009 |
| JP | 2006108917 A | 4/2006 |
| WO | 2007088510 A1 | 8/2007 |

OTHER PUBLICATIONS

Li et al, "Attribute-Based Signature and Its Applications", Apr. 2010, XP55003406, 10 Page.*

(Continued)

*Primary Examiner* — Trang Doan

(57) ABSTRACT

An attribute-based digital signature system comprises a signature generation unit (1) for signing a message (m) by generating a signature (σ) based on a user secret key (SK) associated with a set of user attributes, wherein the signature generation unit (1) is arranged for combining the user secret key (SK) with revocation data (R) to form at least part of the signature (σ), wherein the revocation data (R) complements respective ones of a plurality of valid user secret keys and wherein the revocation data (R) prevents a revoked user secret key (SK) from being used to validly sign a message (m) with the set of user attributes. The system further comprises a revocation unit (2) for selectively removing at least part of the signing capability of a to-be-revoked user secret key (SK), by generating updated revocation data (R), wherein the updated revocation data (R) is based on at least part of the to-be-revoked user secret key (SK). A plurality of attribute authorities 301 may independently issue cryptographic keys.

20 Claims, 4 Drawing Sheets

(56) References Cited

U.S. PATENT DOCUMENTS

| | | | |
|---|---|---|---|
| 2004/0221165 A1 | 11/2004 | Birkhoelzer et al. | |
| 2004/0243814 A1* | 12/2004 | Nakano | G11B 20/00086 713/189 |
| 2005/0021956 A1* | 1/2005 | Genty | G06F 21/41 713/170 |
| 2005/0154889 A1* | 7/2005 | Ashley | H04L 63/0435 713/171 |
| 2005/0169461 A1* | 8/2005 | Canard | H04L 9/3255 380/28 |
| 2006/0133615 A1* | 6/2006 | Bade | G06F 21/33 380/277 |
| 2006/0136748 A1* | 6/2006 | Bade | G06F 21/33 713/193 |
| 2009/0063854 A1 | 3/2009 | Parkinson | |

OTHER PUBLICATIONS

Li et al, "Attribute-Based Signature and Its Applications", Apr. 2010, XP55003406, 10 Pages.*

Shanqing et al, "Attribute-Based Signature Scheme", Information Security and Assurance, Apr. 2008, pp. 509-511.

Ibraimi et al, "Secure Management of Personal Health Records by Applying Attribute-Based Encryption", 6th International Workshop on Warable Micro and Nano Technologies for Personalized Health, Jun. 2009, pp. 71-74.

Menezes et al, "Handbook of Applied Cryptography Key Establishment Protocols", CRC Press Series on Discrete Mathematics and Its Applications, Jan. 1997, pp. 489-541.

Khader, "Attribute Based Group Signature With Revocation", XP55003403, http://eprint.iacr.org/2007/241.pdf, Jun. 2007, 19 Pages.

Boldyreva et al, "Identity-Based Encryption With Efficient Revocation".

Liang et al, "Ciphertext Policy Attribute Based Encryption With Efficient Revocation", bbcr.uwaterloo.cadocument liang.pf, Undated, pp. 1-9.

Asakura, Y. et al. "Renewal problems in role-based access control for distributed system". Journal of IPSJ, pp. 728-739, vol. 50, No. 2, Feb. 2009. (In Japanese—translation ordered).

Fujii, H. et al. "A proposal of efficient attribute-based group signature schemes using pairings". IEICE Technical Report 109(272), 15-22 (2009) (In Japanese—translation ordered).

Ateniese, G. et al. "Some open issues and new directions in group signatures". FC'99, Dec. 16, 1998.

Anzai, J. et al., "A Method for Masked Sharing of Group Keys", The 1999 Symposium on Cryptography and Information Security, Japan, Jan. 26-29, 1999.

Ateniese, G. et al., "Some Open Issues and New Directions in Group Signatures", Finance Cryptography, vol. 1648 of the series Lecture Notes in Computer Science, Abstract.

* cited by examiner

ATTRIBUTE-BASED DIGITAL SIGNATURE SYSTEM

FIELD OF THE INVENTION

The invention relates to an attribute-based digital signature system. The invention further relates to revocation of users in an attribute-based digital signature system.

BACKGROUND OF THE INVENTION

An increasing need for data exchange among different parties involved in a care cycle ranging from traditional healthcare via home healthcare to wellness services has made secure management of health data an important issue. Today's approaches are based on traditional security mechanisms complemented with physical and administrative procedures, limiting the availability of health information and making the exchange of health records cumbersome. Digital policy management and policy enforcement technologies outperform these approaches by offering (1) end-to-end privacy and security in heterogeneous networks, protecting the data independent of the infrastructure over which data travels or institutional boundaries; (2) cryptographic enforcement of role-based or attribute-based access control mechanisms; and (3) interoperable security architecture that allows developing systems in a network agnostic way, obviating the need for network-specific security provisions and hence reducing implementation and maintenance costs.

Another aspect of the data security is to provide non-repudiation of origin, so that the consumer of the data can verify the data origin. In daily life, digital signatures are used to provide non-repudiation. In these digital signatures schemes, a private (or secret) and public key pair is generated for each user, wherein the secret key can be used to sign a message while the public key can be used to verify a signature over the message. However, in a healthcare organization, attributes are usually used to determine the role and identity of the user, and access to data as well as authority to sign a message is granted based on user attributes. In a computer system made for such an organization, the user may create or modify and then sign data if and only if he/she has the appropriate set of attributes. Hence in healthcare, attributes are considered to be an important aspect of the data origin. For example, a pharmacy will accept a prescription order if it has been signed by a user with a specific role or attribute (e.g. a doctor). A digital signature scheme which allows signing a message or content as a user with a specific set of attributes is an attribute-based signature (ABS) scheme. Such an attribute-based signature scheme is described in Dalia Khader, "Attribute Based Group Signature with Revocation", Cryptology ePrint Archive, Report 2007/241, 2007, http://eprint.iacr.org. The cited paper discloses an Attribute based group signature (ABGS) scheme in which a verifier has the capability to identify a revoked user and hence reject the signature if a user is revoked. The process of checking (or verifying) whether a user is revoked or not is done by the verification authority locally by going through a list of revoked users one-by-one. In an attribute-based signature (ABS) scheme, the data is signed according to an access structure, such that only users with the right attributes can sign the data. To be able to sign a message, a user gets from the trusted authority a specific private key that corresponds to the set of certified attributes he/she has. However, the disclosed attribute-based signature scheme provides limited support for revocation of users. In general, user revocation may be desirable, for example when the user's private key is compromised, or when the status of the user changes. For example, the user may change to another job, with other attributes associated therewith.

SUMMARY OF THE INVENTION

It would be advantageous to have an improved attribute-based digital signature system. To better address this concern, a first aspect of the invention provides a system comprising a signature generation unit for signing a message, based on a user secret key associated with a set of user attributes, wherein the signature generation unit is arranged for combining the user secret key with revocation data to form at least part of the signature, wherein the revocation data complements respective ones of a plurality of valid user secret keys and wherein the revocation data prevents a revoked user secret key from being used to validly sign a message.

This system allows a user secret key to be selectively revoked by providing revocation data. To revoke a user, only the revocation data needs to be updated, because the revocation data prevents the revoked user secret key from being used and complements valid user secret keys. As a consequence, the signature generation unit does not have to be provided with a new user secret key. Moreover, because the revocation data only complements the valid user secret keys, but not the revoked user secret keys, the revoked user secret key is prevented from being used to sign a message. Consequently, it is not necessary for a verification unit to go through a list of revoked users in order to see whether the signature was made by means of a revoked user secret key. The signature generation unit may be configured to use the latest version of the revocation data.

The system may comprise a revocation unit for selectively removing at least part of the signing capability of a to-be-revoked user secret key, by providing updated revocation data, wherein the updated revocation data is based on at least part of the to-be-revoked user secret key. The updated revocation data, which is used by the signature generation unit, revokes a user who was previously allowed to sign. The updated revocation data may be distributed to the signature generation unit.

The revocation unit may be arranged for providing a revocation verification component corresponding to the updated revocation data, and the system may comprise a signature verification unit for verifying the signature in dependence on the revocation verification component. The revocation verification component may comprise a data element, such as a number. The revocation verification component is an example of how the use of the latest revocation data by the signature generation unit may be enforced.

The revocation unit may be arranged for selectively removing the signing capability associated with at least one user attribute of the user secret key, by means of the revocation data. This allows revoking only one or some of the attributes associated with a user secret key, instead of the complete user secret key.

The revocation data and the user secret key may be based on a shared secret scheme. This is an efficient scheme for implementing the revocation part of the system.

The user secret key may comprise a share of a secret. This is an efficient way to implement the shared secret scheme.

The revocation data may complement respective shares in the user secret keys except for the share in the revoked user secret key. This is an efficient way to implement the revocation. The share of a revoked user may be included in the revocation data for use by the non-revoked users.

Another aspect of the invention provides an attribute-based digital signature system, comprising a plurality of attribute authorities, wherein an attribute authority is arranged for issuing a cryptographic key to a user independently of the other attribute authorities, wherein the cryptographic key is associated with a set of attributes; and a signature generation unit comprising a receiving unit for receiving a plurality of cryptographic keys associated with different sets of attributes for the same user from different attribute authorities; and a combining unit for combining the plurality of cryptographic keys for the same user for generating a cryptographic signature for a message, wherein the cryptographic signature is associated with attributes from the plurality of cryptographic keys.

This makes it easier to support attributes granted by different independent authorities, because the authorities can issue keys to the users without having to rely on a central authority to coordinate the attributes issued to the users. The signature generation units can receive the keys and combine them, also without having to rely on a central or intermediary authority. It is not necessary to have a central authority that issues secret information that is specific for an attribute authority.

The plurality of attribute authorities may be arranged for generating their own public and master secret key. The public and master secret keys may be based on a public parameter. The public parameter may be the same for all the attribute authorities. This way, the attribute authorities do not depend on a central authority obtain a secret key. This helps to enable the attribute authorities to operate independently.

The plurality of attribute authorities may be arranged for generating the cryptographic keys based on a set of public parameters including a size of the message. This allows the message to be easily processed with the cryptographic keys from different attribute authorities. Alternatively, the plurality of attribute authorities may be arranged for generating the cryptographic keys based on a common group G of a common order p, and wherein the signature generation unit is arranged for generating the signature for a message m which is a member of the group G. This makes it easier to combine the cryptographic keys from the independent authorities, because they all can be used for a message which is a member of the group G. Consequently, it is not necessary to convert the message from one group to the other. Likewise, the attribute authorities may be arranged for using the same hash function.

An individual user may be identified across the plurality of attribute authorities by means of a user identifier. Moreover, the plurality of attribute authorities may be arranged for generating the cryptographic key for a user based on the corresponding user identifier. Using the same user identifiers among the different independent authorities, it is easier to combine the cryptographic keys to form a combined digital signature. Moreover, it may be prevented that cryptographic keys generated for different users are combined by a signature generation unit to generate a signature with attributes from a plurality of users.

Another aspect of the invention provides a medical workstation comprising the system set forth. This allows operating the system conveniently.

Another aspect of the invention provides a medical image acquisition apparatus comprising the system set forth. This allows providing integrated functionality, for example it facilitates generating a signature of acquired image data.

Another aspect of the invention provides a method of attribute-based digital signature processing, comprising a signature generation unit for signing a message, based on a user secret key associated with a set of user attributes, wherein the signature generation unit is arranged for combining the user secret key with revocation data, wherein the revocation data complements a valid user secret key and wherein the revocation data prevents a revoked user secret key from being used to validly sign a message.

Another aspect of the invention provides a computer program product comprising instructions for causing a processor system to perform the method set forth.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

In an attribute-based signature scheme, the signer has a secret key associated with a set of attributes. He can use this secret key to create a signature on a message. The signature is accepted only if it is generated by a secret key associated with the right set of attributes. Attribute based signature can be considered as a form of group signature, with the major distinction that it allows the verifier to determine the attributes (e.g. a role) of the signer. However, in practice there are scenarios where a user with a specific set of attributes might not be allowed to sign a specific message (for example a user is not allowed to sign an approval for a travel request for himself, or the secret key of the user is revoked and is not allowed to sign any message in the future). In this description, an attribute based signature scheme with capability to revoke a specific user is described. Hence, if a revoked user signs a message, then it will not be accepted by the verifier.

In attribute-based signature (ABS) the data is signed according to an access structure (or a set of attributes), such that only users with the right attributes can sign the data. To be able to sign a message, a user gets from the trusted authority a specific private key that corresponds to the set of certified attributes he/she has. The status of the user could change (e.g. a user that changes jobs), or the user's private key might get compromised. In such cases, ideally the system should be able to revoke the user without setting up the system (and all private keys of the other users) all over again.

To address the aforementioned needs, the ABS may be extended with revocation capability. This may be done, for example, based on secret sharing. Each user gets a personalized share, e.g. in the exponent. This personalized share may be obtained for example when requesting the private key from the key authority, and may be updated thereafter. Each user combines his/her share with shares of revoked users in order to recover the secret which helps the signer to generate a valid signature. The revocation is signer-local because the signer performs the combination of shares, which is only possible for non-revoked users. Consequently the revocation becomes apparent already at the time of generating the signature. Hence, if a user is not revoked (is allowed to sign a message), and possesses a correct set of attributes, then he will be able to generate a valid signature; otherwise he will not be able to generate a valid signature.

Figure 1:
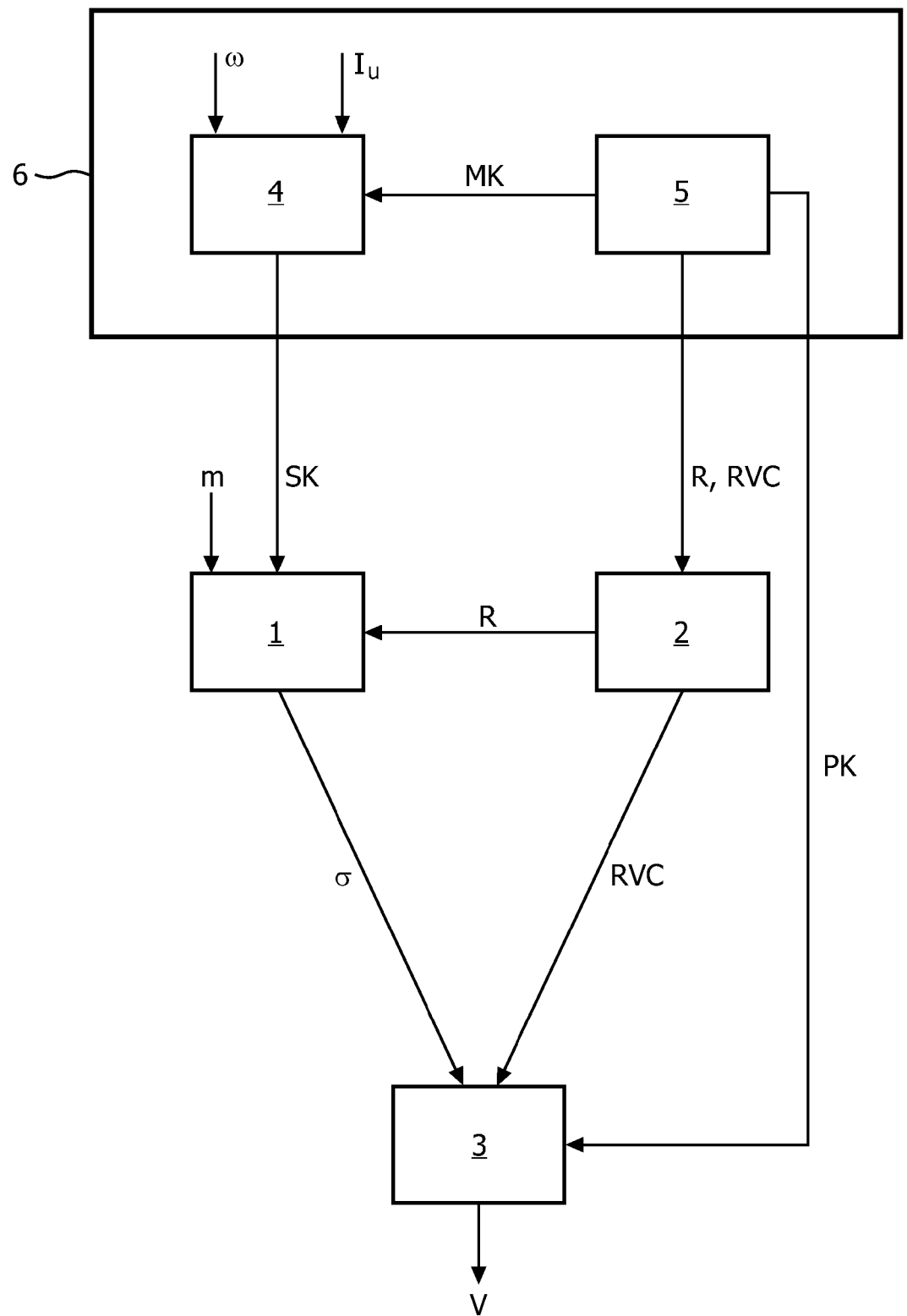
FIG. 1 is a block diagram illustrating aspects of an attribute-based digital signature system.

FIG. 1 shows a block diagram of an attribute-based digital signature system. The system may be implemented in an electronic circuit or by means of software. Usually the system components are distributed over a plurality of devices which interact with each other by communicating the indicated data elements.

The system comprises a signature generation unit 1 for signing a message m by generating a signature σ based on a user secret key SK associated with a set of user attributes ω. The signature generation unit 1 may be arranged for signing the message m according to an attribute set ω using secret key SK. There may be a plurality of user secret keys SK for different users. There may also be a plurality of signature generation units 1. Each signature generation unit 1 may be arranged for using one of the user secret keys SK.

The signature generation unit 1 may be arranged for obtaining revocation data R from a revocation unit 2. To this end, the revocation unit 2 may be arranged for making the revocation data R available at a network location. Such a network location, and the revocation data R, may be made available to a plurality of signature generation units 1. The signature generation unit 1 may be arranged for combining the user secret key SK with revocation data R to form at least part of the signature σ. To this end, the revocation data R complements respective ones of a plurality of valid user secret keys. Herein, a valid user secret key refers to a non-revoked user secret key. Since the revocation data R only complements the valid user secret keys, the revocation data R prevents a revoked user secret key SK from being used to validly sign a message m with the set of attributes ω associated with the user secret key SK. Consequently, the user secret key SK cannot be used to sign a message m according to a set of attributes ω using secret key SK.

The system may comprise a revocation unit 2 for selectively removing at least part of the signing capability of a to-be-revoked user secret key SK, by providing updated revocation data R, wherein the updated revocation data R is based on at least part of the to-be-revoked user secret key SK.

The revocation unit 2 may be further arranged for providing a revocation verification component RVC corresponding to the updated revocation data R. This revocation verification component RVC may be used to verify the validity of the signature σ.

The system may comprise a signature verification unit 3 for verifying the signature σ in dependence on the revocation verification component RVC. The output v of the verification unit 3 may be indicative of the validity of the signature σ. For example, the outcome of a cryptographic operation involving the signature σ and the revocation verification component RVC is indicative of the validity of the signature σ. The signature verification unit 3 may further use a public key PK for the verification.

The revocation unit 2 may be arranged for selectively removing the signing capability associated with at least one user attribute of the user secret key SK, by means of the revocation data R. For example, a portion of a user secret key SK, representing a user attribute, may be complemented by the revocation data. The signature generation unit 1 may be arranged for combining the portion representing a user attribute with the revocation data R. This way, it is possible to revoke only an attribute associated with a user secret key SK rather than the whole user secret key SK. Consequently, the signature generation unit may still be used to generate signatures for policies that do not need the revoked attribute.

The revocation data R and the user secret key SK may be based on a shared secret scheme. For example, the user secret key SK comprises a share of a secret. The revocation data R may complement respective shares in the user secret keys except for the share in the revoked user secret key SK. For example, a minimal number of n different shares may be needed to reconstruct the secret. The revocation data may comprise n−1 shares. The user secret key SK may comprise one share, wherein each user secret key SK comprises a different share. The n−1 shares of the revocation data complement respective ones of the user secret key share to form the minimal number of n shares. To revoke a user secret key, the revoked user's share may be included in the revocation data R together with n−2 other shares. The non-revoked user secret keys still combine with the revocation data R to form n shares, so they can reconstruct the secret; however, the share of the revoked user secret key is the same as one of the shares in the revocation data R, so the revoked user secret key, combined with the revocation data R, only forms n−1 shares, which is insufficient to reconstruct the secret. Consequently, the revoked user secret key cannot be used to reconstruct the secret.

The system may further comprise a key generation unit 4. The key generation unit 4 may generate the user secret keys SK which are used by the signature generation units 1, for example based on a master secret key MK. To implement the support for revocation, a secret key SK may comprise the share of a secret. The master secret key MK may be generated by a setup unit 5. Also, the setup unit 5 may be arranged for generating one or more public keys PK, revocation data R, and/or revocation verification component RVC. The latter may be provided by the revocation unit 2 to a verification unit 3. The public key PK may be used by the signature verification unit 3. The key generation unit 4 and the setup unit 5 may be part of or controlled by a trusted authority 6. Although in the drawing the revocation unit 2 is separate from the trusted authority 6, the revocation unit 2 may also be part of or controlled by the trusted authority 6. To revoke a user, the setup unit 5 may update the revocation data R to include the share of the revoked user, and update the revocation verification data RVC accordingly, to enable a verification unit 3 to verify the signatures σ generated by a signature generation unit 1, based on the updated revocation data R.

The system may be incorporated in a medical workstation, for example a radiology workstation. The workstation may comprise a monitor, a keyboard, and/or a mouse to operate the workstation, as well as a processor and a memory, loaded with suitable software, to provide the functionality of one or more of the signature generation unit 1, the revocation unit 2, the signature verification unit 3, and/or the key generation unit 4.

The system may be incorporated in a medical image acquisition apparatus, for example an x-ray apparatus or an MRI scanner. For example, a user interface may be provided by the medical image acquisition apparatus, enabling a user to authorize image data by means of the user secret key SK.

The system may also be incorporated in a medical information system, such as a hospital information system or a picture archiving system. In such a system, the functionality represented by FIG. 1 may be implemented by means of one or more centralized servers.

It will be understood that in an implementation, the described functionality may be divided into for example units, processes, or subroutines, in many different ways. In this respect, the block diagram of FIG. 1 merely presents an example. Moreover, the functionality may be distributed over a plurality of hardware devices. Although the different blocks of FIG. 1 could be designed to run on different devices, this is not a limitation.

Figure 2:
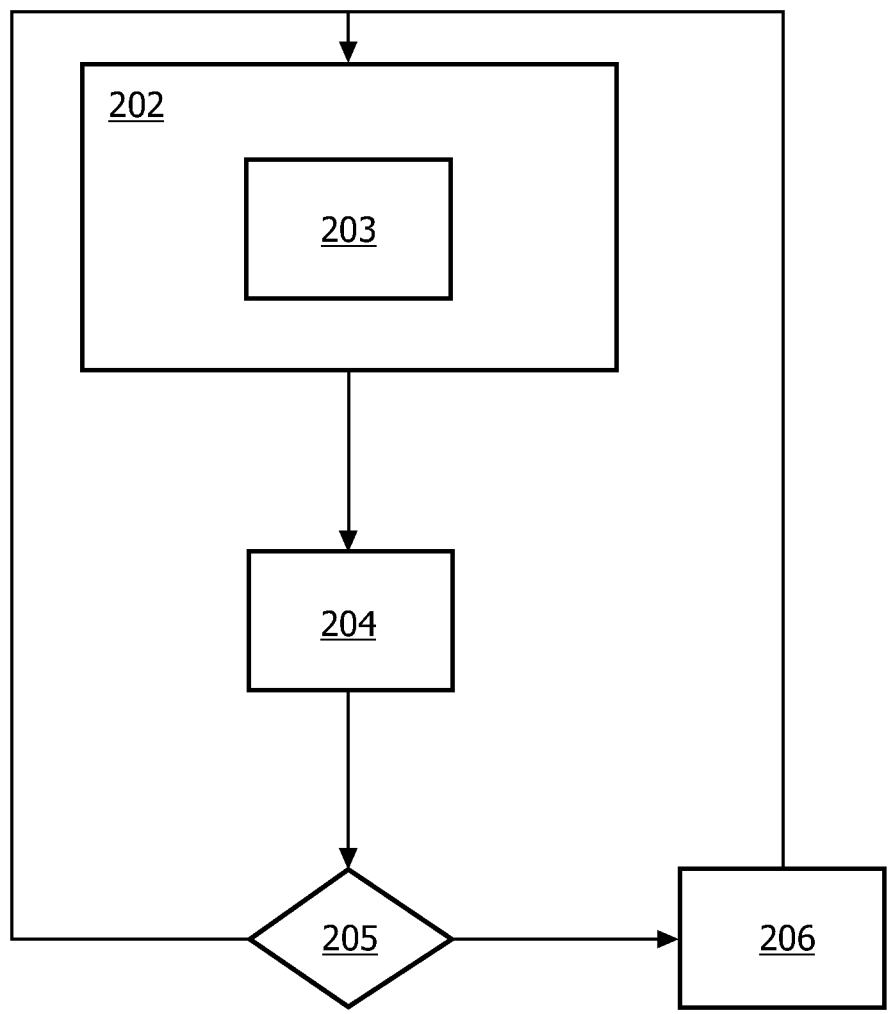
FIG. 2 is a flow chart illustrating aspects of a method of attribute-based digital signature processing.

FIG. 2 illustrates a method of attribute-based digital signature processing. The method comprises step 202 of generating a signature σ based on a user secret key SK associated with a set of user attributes. Step 202 may comprise sub-step 203 of combining the user secret key SK with revocation data R. Herein, the revocation data R complements respective ones of a plurality of valid user secret keys, wherein the revocation data R prevents a revoked user secret key SK from being used to validly sign a message m, in the way set forth. In step 204, the signature σ may be verified. In step 205, it is determined whether a user secret key is to be revoked. If not, the process returns to step 202. To revoke a user secret key, the process proceeds to step 206 to generate updated revocation data R and updated revocation verification component RVC. The updated revocation data R is used in the next execution of step 202, and the revocation verification component RVC is used in the next execution of step 204. The method may be implemented as a computer program product.

In the following, more detailed exemplary embodiments will be described.

In an example Attribute-Based Signature scheme with user revocation capabilities, when a user signs the data, a user may receive a list of revoked user shares $\mathcal{R}$ from a trusted authority (alternatively, the signer may look for $\mathcal{R}$ in a public database maintained by revocation unit 2, for example). In order to generate a valid signature, a user needs a secret key associated with the attribute set w that the user possesses and his/her share should not be in $\mathcal{R}$. If the share of the user is in $\mathcal{R}$, the user should not be able to generate a valid signature.

Algorithms involved in a signature scheme may include Setup, Key Generation, Sign, Verify, and Revoke. These may be described as follows:

Setup: The setup algorithm configures system parameters during the initialization phase and outputs the public parameters, or public key, PK, and a master key MK. The revocation algorithm Revoke ($\mathcal{R}$, $I_u$, RVC) may be implemented as a sub-algorithm of the setup algorithm and be executed by a setup unit 5 or trusted authority 6. However, the revocation sub-algorithm may be executed independently of the remaining steps performed during the initial setup. The revocation data $\mathcal{R}$ may be distributed to signature generating units 1 and/or signature verifying units 3 by a revocation unit 2. The revocation sub-algorithm takes as input an existing revocation data $\mathcal{R}$, and the user identity $I_u$ of a revoked user, and outputs an updated revocation data $\mathcal{R}$ in which the user with identity $I_u$ is revoked. Also, the revocation algorithm may generate a revocation verification component RVC.

Private Key Generation (MK, ω, $I_u$): Run by a key generation unit 4, the key generation algorithm takes as input the attribute set ω the user possesses, the user identity $I_u$, and the master secret key MK, and it outputs user secret key $SK_{I_u,\omega}$.

Sign (m, $\mathcal{R}$, PK, $SK_{I_u,\omega}$): Run by a signature generation unit 1, the algorithm takes as input the message m, the user secret key $SK_{I_u,\omega}$, the public key PK, revocation data $\mathcal{R}$, for example in the form of a set of shares including the shares of revoked users. The algorithm returns the signature $\sigma_\omega$, of message m. The signature may be verifiable as a signature satisfying a particular policy. Alternatively, the signature may be verifiable as a signature signed with the attributes ω associated with the user secret key $SK_{I_u,\omega}$.

Verify (CT, $SK_{I_u,\omega}$, $\sigma_\omega$, RVC): This algorithm may be run by a signature verification unit 3. The algorithm takes as input a message m, the public key PK, a signature $\sigma_\omega$ and revocation verification component RVC. The algorithm returns a data value indicative of whether the signature $\sigma_\omega$, is a valid signature.

The algorithms may have a complexity which is linearly dependent on the number of revoked users "r". The computational complexity and size of the signature scheme may further be linearly dependent on the number of attributes in an access structure according to which a signature is signed, rather than on the total number of users "n".

For example, users may get a personalized share in the exponent during the set-up phase (when they get the private key from the Private Key Generation (PKG) authority). Afterwards, each non-revoked user may combine his/her personalized share in the exponent with the shares of the revoked users or dummy shares (broadcasted by PKG or by the revocation unit) resulting in the recovery of a valid component of a signature.

To support user revocation, the verification authority may be provided with one group element from the revocation list to do the signature verification. At verification time, there is no need to look up the entire list of revoked users to verify whether the user is revoked or not. If a user is revoked, the signature contains an invalid component based on the shared secret scheme and the signature is verified to be invalid.

The proposed scheme may satisfy desirable properties of a signature scheme, such as collusion resistance, unforgeability, user anonymity, and unlinkability.

An embodiment comprises the following algorithms for Setup, KeyGeneration, Sign, Verify, and Revoke. In the scheme, users attribute are elements of $Z_p$, and we assume that there are at most k attributes. However, this is not a limitation. In practice, for example, one can use a collision resistant hash function to map an attribute string to an element of $Z_p$.

1. Setup. The setup algorithm selects a bilinear group $G_0$ of prime order p and random generators g and h. It also chooses bilinear map ê: $G_0 \times G_0 \to G_1$. In addition, the setup picks at random y, $x_1, x_2, \ldots, x_k \in Z_p$, and for a set of attributes $\Omega = \{a_1, a_2, \ldots, a_k\}$, it sets $T_j = g^{y x_j}$ and $T'_j = h^{y x_j}$ ($1 \le j \le k$). The setup algorithm comprises another sub-algorithm which is referred to as revocation algorithm here. This revocation algorithm is used to generate the shares for the revoked users.

1.1 Revocation: This algorithm is also run by the set up algorithm, in order to generate shares for each user which could be used for the purpose of revocation. For the purpose of revocation, it picks R,t$\in Z_p$ and generates a random polynomial $P(x) = a_0 + a_1 x + \ldots + a_r x^r$ of degree r over $Z_p$. It sets $P(0) = R = a_0$, where t+1 shares of polynomial P may be used to reconstruct R. Note that r+1 shares of polynomial P are needed to reconstruct the secret $a_0 = R = P(0)$. For users $I_{ui} \in \{I_{u1}, I_{u2}, \ldots, I_{uN}\}$ where $1 \le i \le N$ and N is the total number of users in the system, a share P ($I_{ui}$) is generated from the polynomial P. The setup algorithm also may compute r extra dummy shares P($I_d$), which may be broadcasted (or put in the public data base) if the number of revoked users is less than r. For example, in the case that r users are being revoked, the algorithm picks, $t \in Z_p$ and generates revocation data which comprise the following:

$$R = \{g^{tP(I_{ui})}\}_{i=1}^{r}, g^t \text{ and } RVC = g^{(y+P(0))t}.$$

This revocation data is then put in the public data base or broadcasted to the users.

The public key PK and the master key MK may comprise the following components:

$$PK = (g, h, h^t, \{T_j\}_{j=1}^{k}, \{T_j'\}^k, \mathcal{R}, RVC)$$

$$MK = (P(0), y, t, \{x_j\}_{j=1}^{k}, g^y)$$

2. KeyGeneraion(IVIK, ω, $I_u$). The key generation algorithm outputs a user secret key associated with the attribute set ω and the identity $I_u$. The algorithm picks a random element $x \in Z^*_p$, and computes the secret key $SK_{I_u, \omega}$ which consists of the following components:

$$\left\{ S_j^{(1)} = g^{\frac{x}{x_j}} \right\} a_j \in \omega$$

$$S^{(2,1)} = g^{qP(I_u)}$$

$$S^{(2,2)} = g^q$$

The secret key also consist of the personalized share of the user i.e. $S^{(2,1)}$. This is used to combine with the shares of the revoked users to generate a valid signature if the user is not one of the revoked users.

3. Sign($SK_{I_u, \omega}$, $\mathcal{R}$, m). This algorithm takes as input the user secret key, shares of revoked users and the message m to be signed. To sign a message $m \in G_1$, the algorithm chooses a random element s', $\kappa \in Z^*_p$ and computes the signature σ, which may comprise the following components:

$$\left\{ \sigma_j^{(1)} = g^{\frac{x\kappa}{x_j}} h^{s'm} \right\} a_j \in \omega$$

$$\sigma^{(2)} = \left( \hat{e}(S^{(2,1)}, g^t) \prod_{I_{u_i} \in R} \hat{e}(g^{tP(I_{u_i})}, g^q) \right)^{\kappa} = \hat{e}(g^t, g^q)^{P(0)\kappa}$$

$$\sigma^{(3)} = S^{(2,2)\kappa} = g^{q\kappa}$$

$$\sigma^{(4)} = g^{s'}$$

The user will be only able to generate a valid signature if the user is not revoked.

4. Verify(σ, PK, RVC). This algorithm takes as input the signature to be verified, the Public key and the RVC component. The RVC component is part of the public key as shown in the Setup ( ) algorithm, however, for the sake of clarity we have shown it separately. The signature is verified in the following way:

$$\hat{e}(\sigma_j^{(1)}, T_j) \cdot \sigma^{(2)} \stackrel{?}{=} \hat{e}(\sigma^{(3)}, g^{(y+P(0))t}) \cdot \hat{e}(T_j', \sigma^{(4)m}) : \forall a_j \in \omega$$

If the above equation holds, then the signature may be accepted.

In attribute-based signature (ABS) schemes, the data is signed according to a set of attributes. To be able to sign a message a user gets from the trusted authority a specific private key that corresponds to the set of certified attributes he/she has. However, in reality different attributes may be managed by different authorities. Accordingly, there is a need for a multi-authority attribute based signature scheme, in which the user may get secret key components from different attribute authorities. For example, when an individual signs a prescription order then he signs according to the multiple attributes which he has been assigned by the multiple authorities. For example, an individual works part time at the university and part time at a hospital. In such scenarios, the user may retrieve secret key components from both organizations such as university hospital. Now when the user signs a document he would sign according to these attributes which are managed by multiple authorities.

To address this demand multi-authority attribute based signature schemes have been proposed. However, known multi-authority attribute based signature schemes depend on the existence of a central authority which should be trusted by all attribute authorities and the users in the system. The main function of the central authority is to establish synchronization between distributed attribute authorities. This is necessary in order to prevent collusion. Collusion means that a malicious user who has knowledge of a first secret key component issued to a first user from a first attribute authority "A1" and a second secret key component issued to a second user from a second attribute authority "A2" could sign a message based on the combination of the first secret key and the second secret key, to sign with the combination of attributes associated with both the first and the second secret key.

The central authority makes known schemes less useful and more difficult to implement. In the following, a decentralized multi-authority attribute based signature scheme is described which can operate without a trusted central authority while remaining collusion-free.

Figure 3:
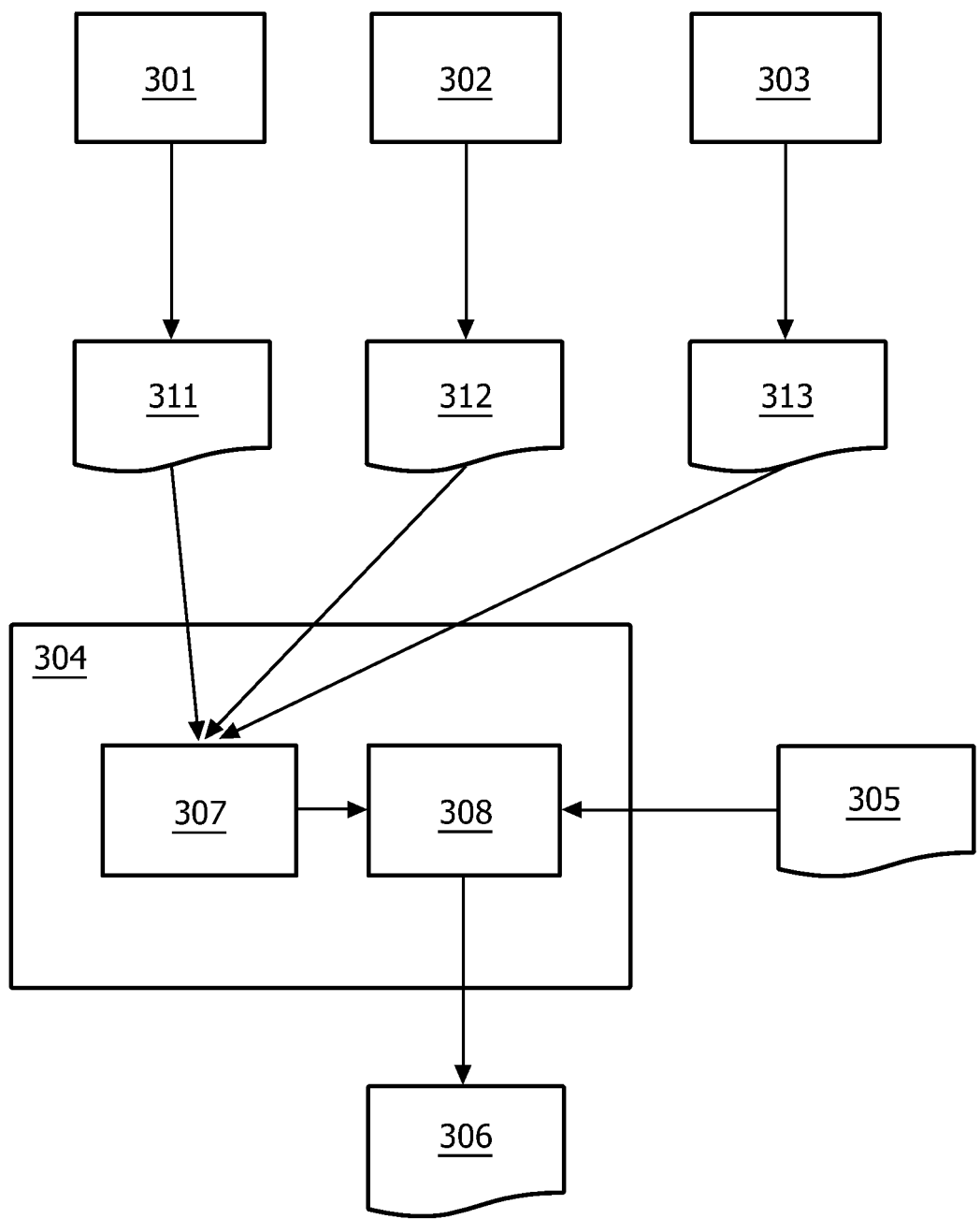
FIG. 3 is a block diagram illustrating aspects of a multi-authority attribute-based digital signature system.

FIG. 3 shows a block diagram of a multi-authority attribute-based digital signature system. The system comprises a plurality of attribute authorities, schematically indicated as blocks 301, 302, 303. However, the number of attributes can be any number, depending on the circumstances there may be more or less than three attribute authorities. The attribute authorities 301, 302, 303 are arranged for independently issuing a cryptographic key associated with a set of attributes to a user. For example, attribute authority 301 issues a cryptographic key 311, attribute authority 302 issues a cryptographic key 312, and attribute authority 303 issues a cryptographic key 313. The attribute authorities 301, 302, 303 do not need to exchange secret information between each other or with a central authority. The attribute authorities 301, 302, 303 may be arranged for generating their own secret keys. This may be done using publicly shared information, such as a format and/or size of elements appearing in the cryptographic algorithms. Cryptographic keys 311, 312, and 313 are for the same user, but they are associated with different attributes. Consequently, the user can obtain a plurality of cryptographic keys 311, 312, 313 from the different authorities 301, 302, 303. The system further comprises a signature generation unit 304. Typically, there may be more than one signature generation unit 304 in the system, for example different users may have their own signature generation units. The signature generation unit 304 may comprise a receiving unit 307 arranged for receiving the cryptographic keys 311, 312, 313 associated with different sets of attributes for the same user from the different attribute authorities 301, 302, 303. The signature generation unit 304 may further comprise a combining unit 308. The combining unit 308 may be arranged for receiving a message 305 from an external source or from a storage means of the signature generation unit 304. The combining unit may further receive the cryptographic keys 311, 312, 313 from the receiving unit 307. The combining unit 308 may further be arranged for combining the plurality of cryptographic keys 311, 312, 313 for the same user for generating a cryptographic signature 306 for a message 305, wherein the cryptographic signature 306 is associated with attributes from the plurality of cryptographic keys 311, 312, 313.

The plurality of attribute authorities 301, 302, 303 may be arranged for generating the cryptographic keys 311, 312, 313 based on a common bilinear group G of a common order p. The signature generation unit 304, in particular the combining unit 308, may be arranged for generating signatures for messages which are a member of the bilinear group G. Consequently, the cryptographic keys from the independent attribute authorities 301, 302, 303 all operate on messages from the same bilinear group G. Additionally or alternatively, the plurality of attribute authorities 301, 302, 303 may be arranged for generating the cryptographic keys 311, 312, 313 based on a common hash function. For example, the hash function may be used to map the identifier for a user to an element of the bilinear group G.

An individual user may be identified across the plurality of attribute authorities 301, 302, 303 by means of a single user identifier. The plurality of attribute authorities 301, 302, 303 may be arranged for generating the cryptographic key 311, 312, 313 for a user based on the corresponding user identifier. The cryptographic scheme may be set up in such a way that only cryptographic keys based on the same user identifier can be combined by the combining unit to form the combined signature 306.

The signature generation unit 304, in particular the combining unit 308, may be arranged for combining the user secret keys (SK), in this case cryptographic keys 311, 312, 313, with revocation data ($R_1$, $R_2$, $R_3$), as described with reference to FIG. 1, to form at least part of the signature 306. However, it is also possible to make a system without support for key revocation but with support for multiple attribute authorities. It is also possible to make a system with support for key revocation but without support for multiple attribute authorities.

The system of FIG. 3 may be implemented in a workstation, for example, or by means of a distributed computer system. Parts of the system, for example the signature generation unit 304, may be incorporated in a medical image acquisition apparatus.

The signature generation unit 304 and each of the attribute authorities 301, 302, 303 may be embodied in separate devices. It is also possible to combine several of these elements in the same device. Herein, a device may be a workstation or a mobile device, for example.

Figure 4:
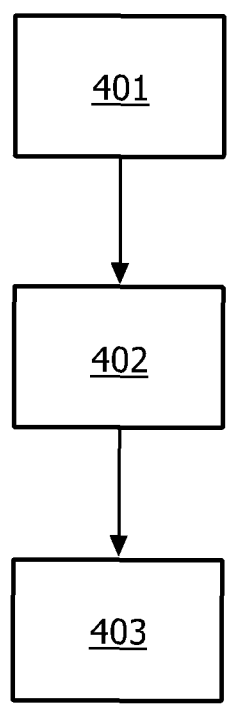
FIG. 4 is a flow chart illustrating aspects of a method of attribute-based digital signature processing in a multi-authority system.

FIG. 4 illustrates a method of signing a message with attributes from a plurality of attribute authorities. The method, by way of example, comprises a step 401 of independently issuing a cryptographic key associated with a set of attributes to a user by a plurality of attribute authorities. The method further comprises step 402 of receiving, by a signature generation unit, a plurality of cryptographic keys associated with different sets of attributes for the same user from different attribute authorities. The method further comprises step 403 of combining, by the signature generation unit, the plurality of cryptographic keys for the same user for generating a cryptographic signature for a message, wherein the cryptographic signature is associated with attributes from the plurality of cryptographic keys. The method may be implemented at least partly by one or more computer programs stored on a suitable storage media.

The following algorithms may be used in a decentralized multi-authority attribute based signature scheme. These algorithms merely serve as examples.

1. Global Setup ($\lambda$) GP: This algorithm takes security parameters $\lambda$ as input and returns the global parameters for the system, which are public. These global parameters may comprise information such as Hash function and bilinear map. These global parameters may be used by the other algorithms. The security parameters k may define information such as the order of the groups used in the algorithms of the attribute authorities and signature generation units. The security parameter $\lambda$ may define the input and/or output size of the most important components in the system. For example, for the finite cyclic Groups i.e. G0 and G1 it may be their order n (prime). In case of the hash function, the global parameters may define the size of their outputs. This information is public and considered to be the part of public parameters (PK). The global setup may be common among all authorities. The authorities may agree on the parameters used in the algorithms, such as groups, hash function and bilinear map.

2. Attribute Authority Setup (GP)→MKi, PKi: Each attribute authority runs its own setup by taking GP as input and produces its own public and master secret key pair, PKi and MKi.

3. Key Generation (MKi, IU, $\omega$U)→SK$\omega$,Iu,i: The key generation algorithm takes as input the master secret key MKi of the attribute authority "i" and attributes (DU of the users for which the authority is capable of issuing the secret key. In addition, it also takes as input an identifier IU of the user, wherein IU is unique in the multi-authority attribute based signature system. For example, IU comprises a social security number. The output of the algorithm comprises the secret key components SK$\omega$,Iu,i for the attributes of the user IU issued by the attribute authority i.

4. Sign (M, SK$\omega$, Iu)$\lambda$)→$\sigma$: The signature algorithm takes as input the secret key SK$\omega$,Iu of the user "U" related to the set of attributes "$\omega$" and the message "M" to be signed. The output of the algorithm comprises the signature "$\sigma$". Herein, SK$\omega$,Iu={SK$\omega$,Iu,i}i comprises the secret key components issued by the different attribute authorities i.

5. Verify (PK, $\sigma$))→→Y or N: The verification algorithm takes as input the public parameters PK={PKi} i comprising the public keys PKi generated for the different attribute authorities i, and the signature $\sigma$. It returns "Y" if the verification is successful, otherwise it returns "N".

In the multi-authority attribute based signature scheme described above, the attribute authorities do not have to share any secret information with each other. Only some public information is shared to improve the efficiency and to make the scheme collusion resistant.

More details are given in the following description of the main algorithms, by way of example only.

1. Global Setup ($\lambda$): The setup algorithm selects a bilinear group $G_0$ of prime order p and random generators g. It also chooses bilinear map e: $G_0 \times G_0 \to G_1$. In addition to this the description of a hash function H:$\{0,1\}^* \to G_0$ that maps the identifier for user u i.e. $I_u$ to elements of $G_0$ is published.

2. Setup run by Attribute Authority "i": The attribute authority picks at random $x_{i,1} x_{i,2} \ldots x_{i,k} \in Z_p$, and for a set of attributes $\Omega_i = \{a_{i,1}, a_{i,2}, \ldots a_{i,k}\}$, it sets $T_{i,j} = g^{x_{i,j}}$ ($1 \le j \le k$).

Note: $\Omega_i$ is the set of the attributes for which attribute authority i can issue secret key components.

The public key $PK_i$ and the master key $MK_i$ may comprise the following components:

$PK_i = (g, \{T_{i,j}\}_{j=1}^{k})$ $MK_i = (\{x_{i,j}\}_{j=1}^{k})$.

3. Key Generation ($MK_i$, $\omega_i$, $I_u$): The key generation algorithm outputs a user secret key associated with the attribute set $\omega_i$ for which authority i is illegible to issue the secret key components. The secret key $SK_{I_u,\omega_i}$ may comprise the following components:

$$SK_{I_u,\omega_i} = \{h^{x_{i,j}}\}_{a_j \in \omega_i}, \text{ where } h=H(I_u)$$

4. Sign ($SK_{I_u,\omega_i}$, m): To sign a message $m \in Z_p$, the algorithm chooses random elements s', $r \in Z_p$ and computes the signature $\sigma$ which may comprise the following components:

$$\sigma = (\sigma_j^{(1)} = \{h^{x_{i,j}r} g^{s'm}\}_{a_{i,j} \in \omega}, \sigma^{(2)} = g^{1/s'}, \sigma^{(3)} = h^{r/s'}),$$

where $\omega = \{\omega_1, \omega_2, \ldots, \omega_n\}$, $\omega_i$ is the attribute set managed by the attribute authority i and n is the total number of attribute authorities.

5. Verify ($\sigma$, PK): To verify the signature, the verifier may verify whether $Z^{(1)} = Z^{(2)}$, wherein $$Z^{(1)} = e(\sigma_j^{(1)}, \sigma^{(2)})$$

$$Z^{(1)} = e\left(h^{x_{i,j}r} g^{s'm}, g^{\frac{1}{s'}}\right): \forall a_{i,j} \in \omega$$

$$Z^{(1)} = e(h, g)^{\frac{x_{i,j}r}{s'}} \cdot e(g, g)^m : \forall a_{i,j} \in \omega, \text{ and}$$

$$Z^{(2)} = e(\sigma^{(3)}, \{T_{i,j}\}_{j=1}^k) \cdot e(g, g)^m$$

$$Z^{(2)} = e\left(h^{\frac{r}{s'}}, g^{x_{i,j}}\right) \cdot e(g, g)^m = e(g, g)^{\frac{x_{i,j}r}{s'}} \cdot e(g, g)^m : \forall a_{i,j} \in \omega$$

If this holds then the signature may be accepted.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An attribute-based digital signature system, comprising:
   a signature generation unit for signing a message (m) by generating a cryptographic signature ($\sigma$) based on a user secret key (SK) associated with a set of user attributes ($\omega$),
   wherein:
   the signature generation unit is arranged for combining the user secret key (SK) with revocation data (R) to form at least part of the cryptographic signature ($\sigma$),
   the revocation data (R) complements respective ones of a plurality of valid user secret keys, and
   the revocation data (R) prevents a revoked user secret key (SK) from being used to validly sign the message (m) with the set of user attributes.

2. The system of claim 1, further comprising a revocation unit for selectively removing at least part of the signing capability of a to-be-revoked user secret key (SK), by providing updated revocation data (R), wherein the updated revocation data (R) is based on at least part of the to-be-revoked user secret key (SK).

3. The system of claim 2, wherein the revocation unit is further arranged for providing a revocation verification component (RVC) corresponding to the updated revocation data (R), and wherein the system comprises a signature verification unit for verifying the signature ($\sigma$) in dependence on the revocation verification component (RVC).

4. The system of claim 2, wherein the revocation unit is arranged for selectively removing the signing capability associated with at least one user attribute of the user secret key (SK), by means of the revocation data (R).

5. The system of claim 1, wherein the revocation data (R) and the user secret key (SK) are based on a shared secret scheme.

6. The system of claim 5, wherein the user secret key (SK) comprises a share of a secret.

7. The system of claim 6, wherein the revocation data (R) complements respective shares in the user secret keys except for the share in the revoked user secret key (SK).

8. The system of claim 1, comprising
a plurality of attribute authorities, wherein an attribute authority is arranged for issuing a cryptographic key to a user independently of the other attribute authorities, wherein the cryptographic key is associated with a set of attributes; and
the signature generation unit comprising:
a receiving unit for receiving a plurality of cryptographic keys associated with different sets of attributes for the same user from different attribute authorities; and
a combining unit for combining the plurality of cryptographic keys for the same user for generating the cryptographic signature for the message, wherein the cryptographic signature is associated with attributes from the plurality of cryptographic keys.

9. The system of claim 8, wherein the plurality of attribute authorities are arranged for generating their own public and master secret key using a public parameter.

10. The system of claim 8, wherein an individual user is identified across the plurality of attribute authorities by means of a user identifier, and wherein the plurality of attribute authorities are arranged for generating the cryptographic keys for a user based on the corresponding user identifier.

11. A workstation comprising the system of claim 1.

12. A medical image acquisition apparatus comprising the system of claim 1.

13. A method of attribute-based digital signature processing, comprising:
signing a message (m) by generating a cryptographic signature (σ) based on a user secret key (SK) associated with a set of attributes (ω) of a user,
wherein:
the generating of the cryptographic signature includes combining the user secret key (SK) with revocation data (R),
the revocation data (R) complements respective ones of a plurality of valid user secret keys, and
the revocation data (R) prevents a revoked user secret key (SK) from being used to validly sign the message (m).

14. The method of claim 13, comprising
independently issuing a cryptographic key associated with a set of attributes of the user by a plurality of attribute authorities;
receiving, by a signature generation unit, a plurality of cryptographic keys associated with different sets of attributes for the user from different attribute authorities; and
combining, by the signature generation unit, the plurality of cryptographic keys for the user for generating a cryptographic signature for a message, wherein the cryptographic signature is associated with attributes from the plurality of cryptographic keys.

15. A non-transitory computer readable medium that includes a program that, when executed by a processor, causes the processor to:
sign a message (m) by generating a cryptographic signature (σ) based on a user secret key (SK) associated with a set of attributes (ω) of a user,
wherein:
the generating of the cryptographic signature includes combining the user secret key (SK) with revocation data (R),
the revocation data (R) complements respective ones of a plurality of valid user secret keys, and
the revocation data (R) prevents a revoked user secret key (SK) from being used to validly sign the message (m).

16. The medium of claim 15, wherein the program causes the processor to:
receive a plurality of cryptographic keys associated with different sets of attributes for the user from different attribute authorities; and
combine the plurality of cryptographic keys for the user for generating the cryptographic signature for the message, wherein the cryptographic signature is associated with attributes from the plurality of cryptographic keys.

17. The medium of claim 15, wherein the program causes the processor to:
receive a revocation verification component (RVC) corresponding to the revocation data (R), and
verify the signature (σ) in dependence on the revocation verification component (RVC).

18. The medium of claim 15, wherein the revocation data (R) selectively removes the signing capability associated with at least one of the attributes of the user secret key (SK).

19. The medium of claim 15, wherein the revocation data (R) and the user secret key (SK) are based on a shared secret scheme.

20. The medium of claim 19, wherein the revocation data (R) is associated with a plurality of user secret keys and complements respective shares in the user secret keys except for the share in a revoked user secret key (SK).

* * * * *